(12) United States Patent
Fuleshwar Prasad et al.

(10) Patent No.: US 10,882,691 B2
(45) Date of Patent: Jan. 5, 2021

(54) CONTROLLING DETECTION OF CARGO TRANSPORTATION UNIT CONDITIONS

(71) Applicant: BlackBerry Limited, Waterloo (CA)

(72) Inventors: Mahendra Fuleshwar Prasad, Waterloo (CA); Jesse William Bennett, Apex, NC (US); Scott Leonard Dill, Waterloo (CA); Mark Edward Reaume, Waterloo (CA); Jason Wayne Jantzi, St. Clements (CA); Yu Gao, Waterloo (CA); Alexander Karl Levato, Toronto (CA)

(73) Assignee: BlackBerry Limited, Waterloo (CA)

( * ) Notice: Subject to any disclaimer, the term of this patent is extended or adjusted under 35 U.S.C. 154(b) by 283 days.

(21) Appl. No.: 15/904,484

(22) Filed: Feb. 26, 2018

(65) Prior Publication Data

US 2018/0244465 A1 Aug. 30, 2018

Related U.S. Application Data

(60) Provisional application No. 62/464,980, filed on Feb. 28, 2017.

(51) Int. Cl.
*B65D 90/48* (2006.01)
*G01D 21/00* (2006.01)
*G01D 18/00* (2006.01)
*F25D 29/00* (2006.01)

(52) U.S. Cl.
CPC ............ *B65D 90/48* (2013.01); *G01D 21/00* (2013.01); *F25D 29/003* (2013.01); *F25D 29/005* (2013.01); *F25D 2700/02* (2013.01); *F25D 2700/06* (2013.01); *F25D 2700/12* (2013.01); *G01D 18/00* (2013.01)

(58) Field of Classification Search
None
See application file for complete search history.

(56) References Cited

U.S. PATENT DOCUMENTS 5,420,794 A 5/1995 James
5,983,655 A * 11/1999 Kistner ............... B60H 1/3232
62/163
6,862,499 B1 * 3/2005 Cretella ............... G05D 27/02
700/276

(Continued)

FOREIGN PATENT DOCUMENTS

WO 2015/168570 11/2015
WO 2016100668 6/2016

OTHER PUBLICATIONS

Gard, Inc; Ostrem, Fred; Godshall, W. D.; An Assessment of the Common Carrier Shipping Environment, General Technical Report FPL 22, Forest Products Laboratory Forest Service U.S. Department of Agriculture (Year: 1979).*

(Continued)

*Primary Examiner* — Lina M Cordero
(74) *Attorney, Agent, or Firm* — Trop, Pruner & Hu, P.C.

(57) ABSTRACT

In some examples, a system includes a communication interface, and at least one processor configured to cause sending, to a sensor device attached to a cargo transportation unit (CTU), parameter information through the communication interface, the parameter information controlling detection of a condition associated with the CTU by the sensor device.

18 Claims, 4 Drawing Sheets

(56) References Cited

U.S. PATENT DOCUMENTS

| | | |
|---|---|---|
| 7,139,660 B2 | 11/2006 | Sarkar |
| 7,685,162 B2 | 3/2010 | Heider |
| 9,428,197 B2 | 8/2016 | Chen |
| 9,440,786 B2 * | 9/2016 | Giesbers ................ B65D 88/12 |
| 2006/0161345 A1 | 7/2006 | Mishima et al. |
| 2007/0267509 A1 | 11/2007 | Witty et al. |
| 2009/0106990 A1 * | 4/2009 | Harrill .................... B60G 7/006 |
| | | 33/288 |
| 2009/0189788 A1 | 7/2009 | Faus et al. |
| 2009/0248218 A1 | 10/2009 | Dyrmose |
| 2011/0221573 A1 | 9/2011 | Huat |
| 2012/0114010 A1 | 5/2012 | Branch |
| 2012/0314059 A1 * | 12/2012 | Hoffmann ............. G06T 7/0004 |
| | | 348/135 |
| 2013/0002443 A1 * | 1/2013 | Breed ................... G01J 5/0846 |
| | | 340/686.1 |
| 2014/0343885 A1 | 11/2014 | Abrahamsson et al. |
| 2016/0216028 A1 * | 7/2016 | Jonsson ................ F25D 29/003 |
| 2016/0239802 A1 * | 8/2016 | Burch, V ................ H04W 4/70 |
| 2019/0003765 A1 * | 1/2019 | Chen ................. B60H 1/00964 |

OTHER PUBLICATIONS

W. Lang, R. Jedermann, D. Mrugala, A. Jabbari, B. Krieg-Brückner and K. Schill, "The "Intelligent Container"—A Cognitive Sensor Network for Transport Management," in IEEE Sensors Journal, vol. 11, No. 3, pp. 688-698, Mar. 2011, doi: 10.1109/JSEN.2010.2060480 (Year: 2011).*
AA1CAR, Engine Coolant Sensors dated on or before Feb. 2017 (13 pages).
Chris Perkins, Koenigsegg Can Remotely Adjust the Suspension on Their Cars From Anywhere in the World, Dec. 13, 2016 (10 pages).
Edward Snow Willis et al., U.S. Appl. No. 15/486,990 entitled Parameter Sets for Vehicles Based on Sensor Data filed Apr. 13, 2017 (33 pages).
Edward Snow Willis et al., U.S. Appl. No. 15/486,985 entitled Parameter Sets for Vehicles filed Apr. 13, 2017 (31 pages).
ISA/US, International Search Report and Written Opinion for Int. Appl. No. PCT/US2018/019620 dated May 7, 2018 (13 pages).
European Patent Office, Extended European Search Report for Appl. No. 18761949.9 dated Oct. 27, 2020 (9 pages).

* cited by examiner

CONTROLLING DETECTION OF CARGO TRANSPORTATION UNIT CONDITIONS

CROSS-REFERENCE TO RELATED APPLICATION

The present application claims the benefit under 35 U.S.C. § 119(e) of U.S. Provisional Application No. 62/464,980, filed Feb. 28, 2017, which is hereby incorporated by reference.

BACKGROUND

A transport chassis is a support structure that can be used to carry a cargo transportation unit (CTU), such as a shipping container. The shipping container can be used to carry cargo. The transport chassis can be part of a truck, or alternatively, can be part of a trailer that has wheels. Different CTUs can have different configurations and/or can be operated in different environments or contexts.

BRIEF DESCRIPTION OF THE DRAWINGS

Some implementations of the present disclosure are described with respect to the following figures.

Figure 1:
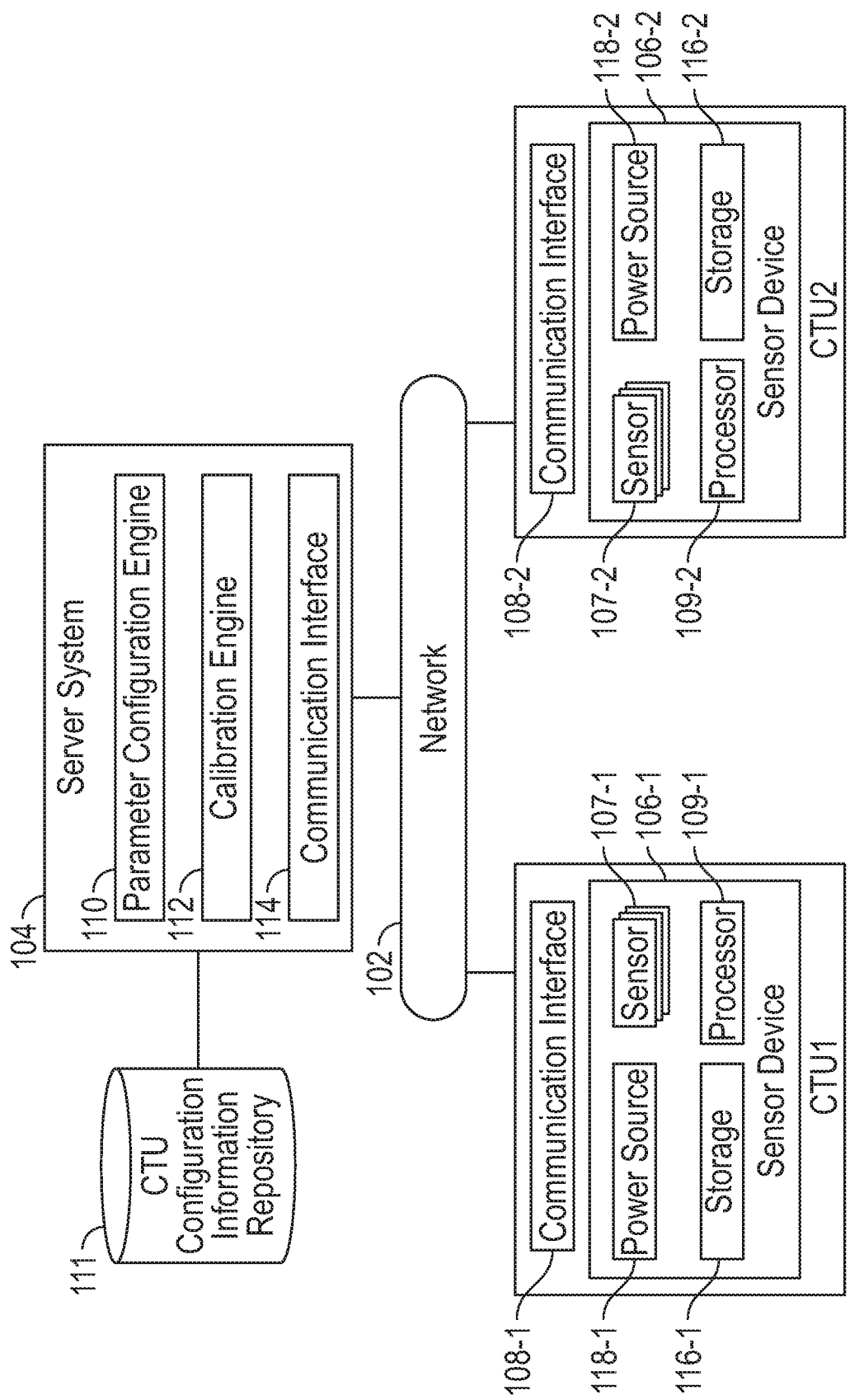
FIG. 1 is a block diagram of an example arrangement that includes cargo transportation units (CTUs) and a server system, according to some implementations of the present disclosure.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A cargo transportation unit (CTU) can refer to structure that is used to carry cargo items. A "cargo item" can refer to any physical item that is to be delivered from one location to another location. "Cargo" can refer to one or more cargo items.

An example of a CTU is a shipping container that defines an inner chamber in which cargo can be placed. The shipping container can be enclosed on all sides, such that cargo items placed within the inner chamber of the shipping container are protected from the outside environment. In other examples, the shipping container can be partially open on at least one side, such as the top side, or a lateral side. As another example, a CTU can be a flatbed structure without walls. More generally, a CTU can refer to any platform or structure that is used to carry cargo.

A CTU can be carried by a transport chassis. A transport chassis can be part of a truck or a trailer (that is to be hauled by a tractor or other vehicle). More generally, a transport chassis is moveable by a vehicle between different geographic locations, for the purpose of carrying a CTU and/or cargo between different geographic locations. A transport chassis can be part of, mounted on, or attached to a vehicle, such as a truck, a trailer, a tractor, a car, a railed vehicle (e.g., a train), a watercraft (e.g., a ship), an aircraft, a spacecraft, and so forth.

In some examples, a vehicle to which a CTU is attached to, mounted on, or part of, can be a driverless vehicle that can be self-driving. A driverless vehicle (also referred to as an "autonomous vehicle") refers to a vehicle that is without a driver, i.e., a human that controls the movement of the vehicle while the driver is located on the vehicle. A self-driving or autonomous vehicle has the intelligence and self-awareness to perform driving tasks, including driving itself from an origin to a destination, without any human driver on the vehicle.

In other examples, CTUs can be hauled by vehicles driven by human drivers.

CTUs can include sensor devices for measuring various conditions of the CTUs. As examples, a sensor device can include one or more sensors to measure respective one or more of the following conditions: a cargo loading condition that indicates an amount of cargo being carried by a CTU, a motion condition that indicates a motion of the CTU, a door status condition that indicates a status of a door (e.g., whether the door is open or closed), an environment condition, such as one or more of a temperature, a pressure, a humidity, and so forth. Although specific conditions are listed above, it is noted that in other examples, sensor devices can measure other or additional conditions.

Different CTUs can have different configurations and/or can be operated in different environments or contexts. The different configurations and/or different environments of the CTUs can affect measurements made by sensor devices of the CTUs, and/or the conclusions that can be drawn based on the measurements by the sensor devices. For example, a cargo loading sensor can be implemented as a time-of-flight (ToF) sensor, which measures the time of flight of a signal (e.g., a light signal, an acoustic signal, etc.) that is emitted by an emitter and reflected from a surface inside a CTU. Two different CTUs can have cargo carrying chambers of different dimensions. Thus, a first distance measured by a ToF sensor in a first CTU having a cargo carrying chamber of a first dimension can indicate a first cargo loading status, while the same first distance measured by a ToF sensor in a second CTU that has a cargo carrying chamber of a second, different dimension can indicate a different cargo status. A cargo status can be an empty status (where the CTU does not carry any cargo), a full status (where the CTU is fully loaded), or a partially loaded status (where the CTU is partially loaded with cargo). In some cases, different distances measured by a ToF sensor can represent different amounts of cargo loading.

As another example, a CTU may be operated in different environments, such as environments of different temperatures. The different environments can affect the accuracy of a sensor. For example, for a given condition, a sensor of a CTU may provide different measurements under different environments (e.g., different temperatures).

FIG. 1 is a block diagram of an example arrangement that includes CTU1 and CTU2, which are able to communicate over a network 102 with a server system 104. Although two CTUs are shown in FIG. 1, it is noted that in other examples, just one CTU or more than two CTUs can be provided.

The server system 104 can include a computer system or an arrangement of computer systems. In some examples, the server system 104 can be part of a web server system, a cloud server system, and so forth.

As shown in FIG. 1, CTU1 includes a sensor device 106-1, and CTU2 includes a sensor device 106-2. A sensor device can include one or more sensors (107-1 or 107-2) for measuring respective conditions of each CTU. In some examples, a sensor device can be implemented as a circuit board on which various electronic components are provided. In other examples, a sensor device can be implemented as a different type of electronic device. Each sensor device 106-1 or 106-2 can be considered an Internet of Things (IoT) device in some examples.

CTU1 further includes a communication interface 108-1 to allow CTU1 to communicate over the network 102, and CTU2 includes a communication interface 108-2 to allow the CTU2 to communicate over the network 102. Each communication interface can include a wireless transceiver to transmit and receive signals over the network 102, in some examples. A communication interface can also include one or more protocol layers that are part of a protocol stack for handling communications according to respective protocols, such as an Ethernet protocol, an Internet Protocol (IP), and so forth.

Although FIG. 1 shows each communication interface 108-1 or 108-2 as being external of the sensor device 106-1 or 106-2, in further examples, the communication interface 108-1 or 108-2 can be included in the respective sensor device 106-1 or 106-2 in further examples.

The network 102 can include a wireless network, such as a cellular network, a wireless local area network (WLAN), and so forth. An example cellular network can operate according to the Long-Term Evolution (LTE) standards as provided by the Third Generation Partnership Project (3GPP). The LTE standards are also referred to as the Evolved Universal Terrestrial Radio Access (E-UTRA) standards. In other examples, other types of cellular networks can be employed, such as second generation (2G) or third generation (3G) cellular networks, e.g., a Global System for Mobile (GSM) cellular network, an Enhanced Data rates for GSM Evolution (EDGE) cellular network, a Universal Terrestrial Radio Access Network (UTRAN), a Code Division Multiple Access (CDMA) 2000 cellular network, and so forth. In further examples, cellular networks can be fifth generation (5G) or beyond cellular networks. In additional examples, a wireless network can include a WLAN, which can operate according to the Institute of Electrical and Electronic Engineers (IEEE) 802.11 or Wi-Fi Alliance Specifications. In other examples, other types of wireless networks can be employed by CTU1 to communicate with a remote service, such as a Bluetooth link, a ZigBee network, and so forth. Additionally, some wireless networks can enable cellular IoT, such as wireless access networks according to LTE Advanced for Machine-Type Communication (LTE-MTC), narrowband IoT (NB-IoT), and so forth.

The server system 104 includes a parameter configuration engine 110 and a calibration engine 112 according to some implementations of the present disclosure. The parameter configuration engine 110 can set values of parameters that control how sensor devices of CTUs detect conditions associated with the CTUs. In some examples, the parameter configuration engine 110 is able to access a CTU configuration information repository 111 to retrieve information pertaining to a configuration of a CTU. The configuration can be used to generate the values of parameters that control how sensor devices of CTUs detect conditions associated with the CTUs.

The calibration engine 112 can produce calibration information used to calibrate sensor devices of CTUs for different environments or contexts of the CTUs. The calibration engine 112 can receive input information regarding the environments or contexts of the CTUs, such as from the CTUs, from operator(s) of the CTUs, or from the CTU configuration information repository 111.

As used here, the term "engine" can refer to a hardware processing circuit, including any or some combination of a microprocessor, a core of a multi-core microprocessor, a microcontroller, a programmable integrated circuit device, a programmable gate array, or any other type of hardware processing circuit. In other examples, the term "engine" can refer to a combination of a hardware processing circuit and machine-readable instructions executable on the hardware processing circuit.

Although FIG. 1 shows the engines 110 and 112 as being separate engines of the server system 104, it is noted that in further examples, the engines 110 and 112 can be combined into one engine. Moreover, in other examples, the parameter configuration engine 110 and the calibration engine 112 can be provided in respective different server systems.

The server system 104 includes a communication interface 114 to allow the server system 104 to communicate over the network 102 with CTUs. The communication interface 114 can be used to communicate the parameters set by the parameter configuration engine 110 and the calibration information set by the calibration engine 112 over the network 102 to CTU1 and CTU2, for example.

As further shown in FIG. 1, each sensor device 106-1 or 106-2 includes a respective storage 116-1 or 116-2. The storage 116-1 or 116-2 can be implemented using a memory device, a solid-state storage device, a disk-based storage device, or any other type of storage device. Although FIG. 1 shows the storage 116-1 or 116-2 as being part of the respective sensor device 106-1 or 106-2, in other examples, the storage 116-1 or 116-2 can be separate from the respective sensor device 106-1 or 106-2, but accessible by the sensor device. The storage 116-1 or 116-2 can be used to store parameters or calibration information provided by the parameter configuration engine 110 or calibration engine 112, respectively, and received by the respective CTU over the network 102.

Each sensor device 106-1 or 106-2 can include a respective power source 118-1 or 118-2. For example, the power source 118-1 or 118-2 can include a battery. Other types of power sources can be used in other examples, such as a power adapter connected to a power outlet of a CTU.

In some examples, each sensor device 106-1 or 106-2 includes a respective processor 109-1 or 109-2. A processor can include a hardware processing circuit, such as any or some combination of a microprocessor, a core of a multi-core microprocessor, a microcontroller, a programmable integrated circuit device, a programmable gate array, or any other type of hardware processing circuit. The processor 109-1 or 109-2 can be used to perform certain tasks of each sensor device, such as to detect a condition of the CTU based on measurement data acquired by a respective sensor 107-1 or 107-2 and the parameters received from the server system 104.

The sensors 107-1 or 107-2 of each sensor device 106-1 or 106-2 can include any or some combinations of the following types of sensors: a cargo loading sensor, such as a ToF sensor, to detect cargo loading in the CTU; a door status sensor to detect the status of a door (open or closed); a motion sensor to detect motion of the CTU; an environment sensor to detect an environment of the CTU, such as a temperature sensor, a pressure sensor, a humidity sensor, or any other type of sensor for measuring an environmental condition; or any other type of sensor.

A motion sensor can include an accelerometer, a gyroscope, or any other type of sensor that can be used to detect movement of a CTU or any portion of a CTU. A door status sensor can also include an accelerometer, a gyroscope, and so forth, for detecting motion of a door (such as rotational motion of a door that swings between open and closed positions, or longitudinal motion of a door that slides between open and closed positions).

In further examples, additional or alternative sensors can be included in each sensor device 106-1 or 106-2.

Figure 2:
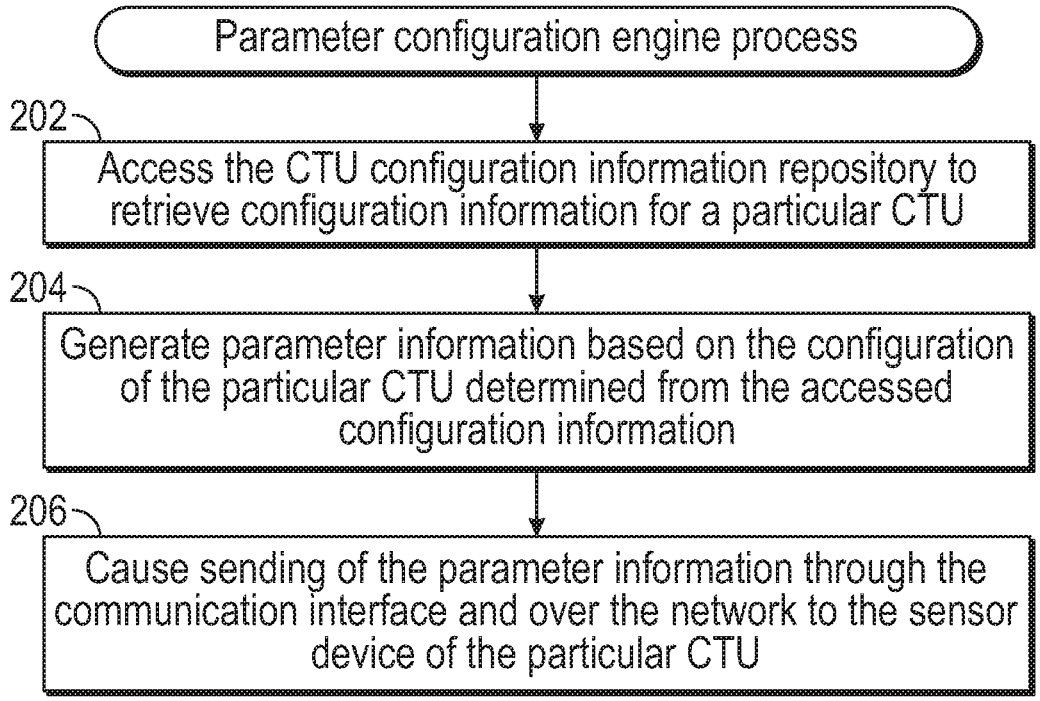
FIG. 2 is a flow diagram of a process of a parameter configuration engine, according to some implementations.

FIG. 2 is a flow diagram of a process performed by the parameter configuration engine 110 according to some implementations of the present disclosure. The parameter configuration engine 110 accesses (at 202) the CTU configuration information repository 111 to retrieve configuration information for a particular CTU, such as CTU1 or CTU2 in FIG. 1. The configuration information for the particular CTU can include a dimension of a cargo carrying chamber or space of the particular CTU, a type of the particular CTU (e.g., a container-based CTU or a flatbed CTU), a type of door (e.g., a door that rotates between open and closed positions, or a door that slides between open and closed positions), a type of cargo that is to be carried by the particular CTU (e.g., cargo that is solid, cargo that has holes or openings, etc.), a type of suspension of the particular CTU (e.g., spring-based suspension, air-based suspension, etc.), a number of distinct zones of the particular CTU for storing cargo, and so forth.

The parameter configuration engine 110 generates (at 204) parameter information based on the configuration of the particular CTU determined from the accessed configuration information. The parameter information that is generated controls detection of a condition associated with the particular CTU by a sensor device of the particular CTU. For example, the parameter information can include a cargo detection parameter that controls a detection of an amount of cargo loading based on measurement data from a sensor of the sensor device, such as a ToF sensor. The cargo detection parameter can include a cargo detection threshold that relates to a dimension of a space to receive cargo in the particular CTU. The cargo detection threshold can be a distance threshold. If a distance measured by the ToF sensor is greater than the distance threshold, then that indicates that the CTU is empty and thus is not carrying cargo. However, if the measured distance is less than the threshold, then that indicates that the CTU is loaded with cargo. Multiple distance thresholds can be specified for indicating respective different amounts of loading of cargo (e.g., a percentage of loading) in the particular CTU. Alternatively, the parameter information provided by the parameter configuration engine 110 can be used as part of an equation or expression to be used by the sensor device in computing an amount of cargo loading based on a measured distance by the ToF sensor. In some examples, the amount of cargo loading can be performed by the server system 104. In other examples, the amount of cargo loading can be performed at the CTU.

In further examples, the parameter information generated by the parameter configuration engine 110 can include a cargo type parameter that is set to different values for respective different types of cargo in the particular CTU. For example, certain types of cargo can be solid objects, while other types of cargo can be in the form of frames with many holes or openings. The cargo type parameter that is set to different values to indicate respective different types of cargo can be used by the cargo loading algorithm implemented by the sensor device to fine tune cargo loading detection for different types of cargo. For cargo including solid objects indicated by the cargo type parameter, the cargo loading algorithm performed by the sensor device (such as by the processor 109-1 or 109-2 in the respective sensor device shown in FIG. 1) can base a measured distance on just a single measurement or a few measurements (e.g., less than a threshold number of measurements). However, if the cargo type parameter indicates cargo with many holes or openings, then the cargo loading algorithm performed by the sensor device can base a measured distance on a larger number of measurements (e.g., greater than the threshold number of measurements).

In further examples, the parameter information can include a CTU type parameter that is set to different values to indicate respective different types of the particular CTU, such as a flatbed CTU, a container-based CTU, and so forth. A flatbed CTU does not have a door, while a container-based CTU has a door. If the CTU type parameter indicates a type of CTU with a door, then the sensor device (and more specifically, the processor 109-1 or 109-2 in the sensor device) can apply a door status algorithm to detect whether the door is open or closed. If the CTU type parameter indicates a type of CTU without a door, then the sensor device does not apply a door status algorithm.

Additionally, the parameter information can include a door type parameter to indicate a type of door used by the particular CTU. In some examples, a door is rotated between an open position and a closed position. In another example, a door can slide up and down between an open position and a closed position. The type of door that is used by the particular CTU impacts the door status algorithm used by the sensor device to detect the door status. For a door that rotates between an open position and a closed position, the sensor device will use a door status algorithm that takes into account rotational motion measurements. For a door that slides between an open position and a closed position, the sensor device uses a door status algorithm that detects linear motion of the door.

In further examples, the parameter information includes a motion parameter that controls a detection of motion of the particular CTU based on measurement data from the motion sensor. The motion can include vibration motion, such as up and down vibration motion. The vibration motion can be used to determine whether the particular CTU is experiencing excessive vibration. The motion parameter that is useable to detect such vibration motion can indicate the type of suspension of the particular CTU. A spring-based suspension may experience less movement in response to a given force than an air-based suspension. Alternatively, the motion parameter can be a motion threshold to which measurement movement of the particular CTU is compared to determine whether the particular CTU is experiencing excessive motion. The motion threshold can vary based on the type of suspension of the particular CTU.

In further examples, the parameter information includes an environment parameter that controls the detection of whether an environmental condition as measured by an environmental sensor (e.g., a temperature sensor, a pressure sensor, a humidity sensor, etc.) violates a criterion. The environment parameter can include a threshold, such as a temperature threshold, a pressure threshold, a humidity threshold, etc. If a measured temperature exceeds the temperature threshold or drops below the temperature threshold, then that indicates a temperature violation. Similarly, if a measured pressure exceeds or drops below a pressure threshold, then that indicates a pressure condition violation. Also, if a measured humidity exceeds a humidity threshold or drops below humidity threshold, then that indicates a humidity condition violation.

The parameter information can also include a zone parameter identifying a number of distinct zones in the particular CTU for carrying cargo. For example, the particular CTU can have a cool zone (that is refrigerated), a hot zone (that is heated), and a neutral zone (that is at ambient temperature). Different environment thresholds can be set for the different zones, since these different zones are expected to be at respective different environmental conditions.

The parameter configuration engine 110 causes sending (at 206) of the parameter information through the communication interface 114 and over the network 102 to the sensor device of the particular CTU.

Figure 3:
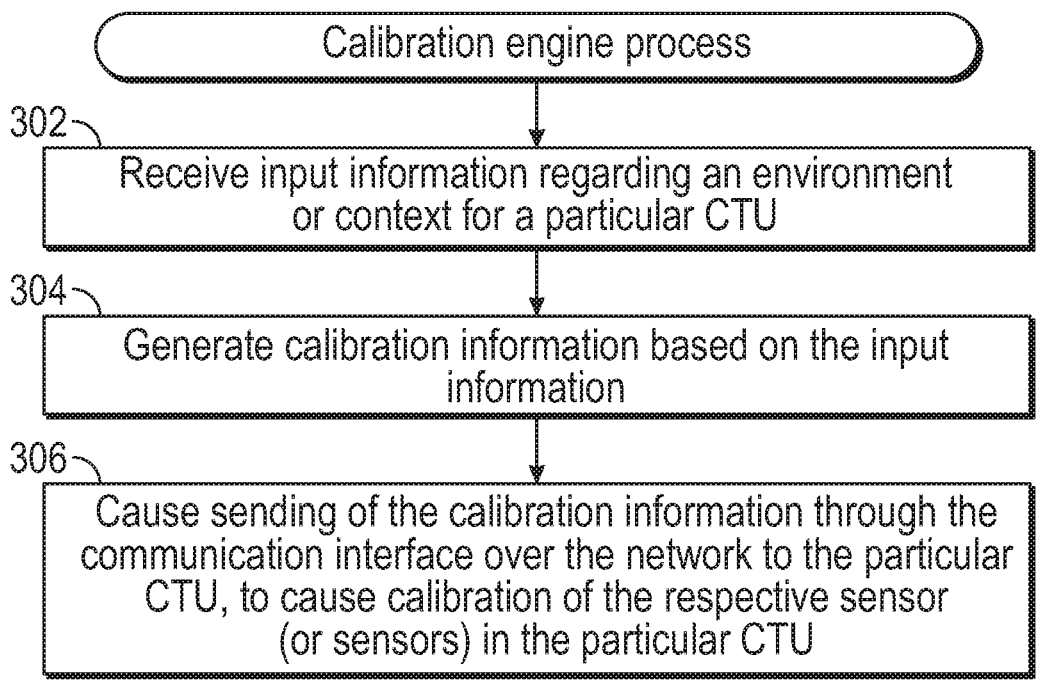
FIG. 3 is a flow diagram of a process of a calibration engine, according to further implementations.

FIG. 3 is flow diagram of a process performed by the calibration engine 112 according to some examples. The calibration engine 112 receives (at 302) input information regarding an environment or context for a particular CTU. The input information can be received from a sensor of the particular CTU, or can be received from another source, such as the CTU configuration information repository 111 or a different source (e.g., an operator of the particular CTU). The received input information can include information of an ambient environmental condition of the particular CTU, such as the outside temperature of the CTU, the outside atmospheric pressure of the particular CTU, the outside humidity of the particular CTU, and so forth. Sensor measurements made by sensors of the particular CTU can be affected by different environmental conditions.

The input information can also include a dimension of the particular CTU, such as the dimension of the cargo carrying space of the particular CTU. Additionally, the input information can indicate a type of cargo that is carried by the particular CTU.

The calibration engine 112 generates (at 304) calibration information based on the input information. The calibration information can include a calibration parameter that is set to different values for different environment conditions. For example, if the particular CTU is operated in a hot or cold environment, then the calibration parameter can be set to a specific value to calibrate a sensor to operate in the hot or cold environment. As another example, the calibration information can include a calibration parameter set to different values for different dimensions of the cargo carrying space or different types of cargo. For example, for a large cargo carrying space, the calibration parameter can be set to a value to cause a signal emitter (e.g., a light emitter, an acoustic emitter, etc.) of a ToF sensor to generate a signal of a higher strength so that the ToF sensor can more effectively detect a signal that has traversed a larger distance. As another example, for cargo with many holes or openings, the calibration parameter can be set to a value to increase the sensitivity of the ToF sensor so that the ToF sensor can detect signals reflected from surfaces with many holes or openings.

The calibration engine 112 then causes sending (at 306) of the calibration information through the communication interface 114 over the network 102 to the particular CTU, to cause calibration of the respective sensor (or sensors) in the particular CTU.

The environment or context of use of the particular CTU is unknown at the time of design of the sensor device to be used in the particular CTU. The calibration information can cause calibration of the sensor(s) in the particular CTU so that the sensor(s) can operate accurately in the respective environment or context based on the input information.

Figure 4:
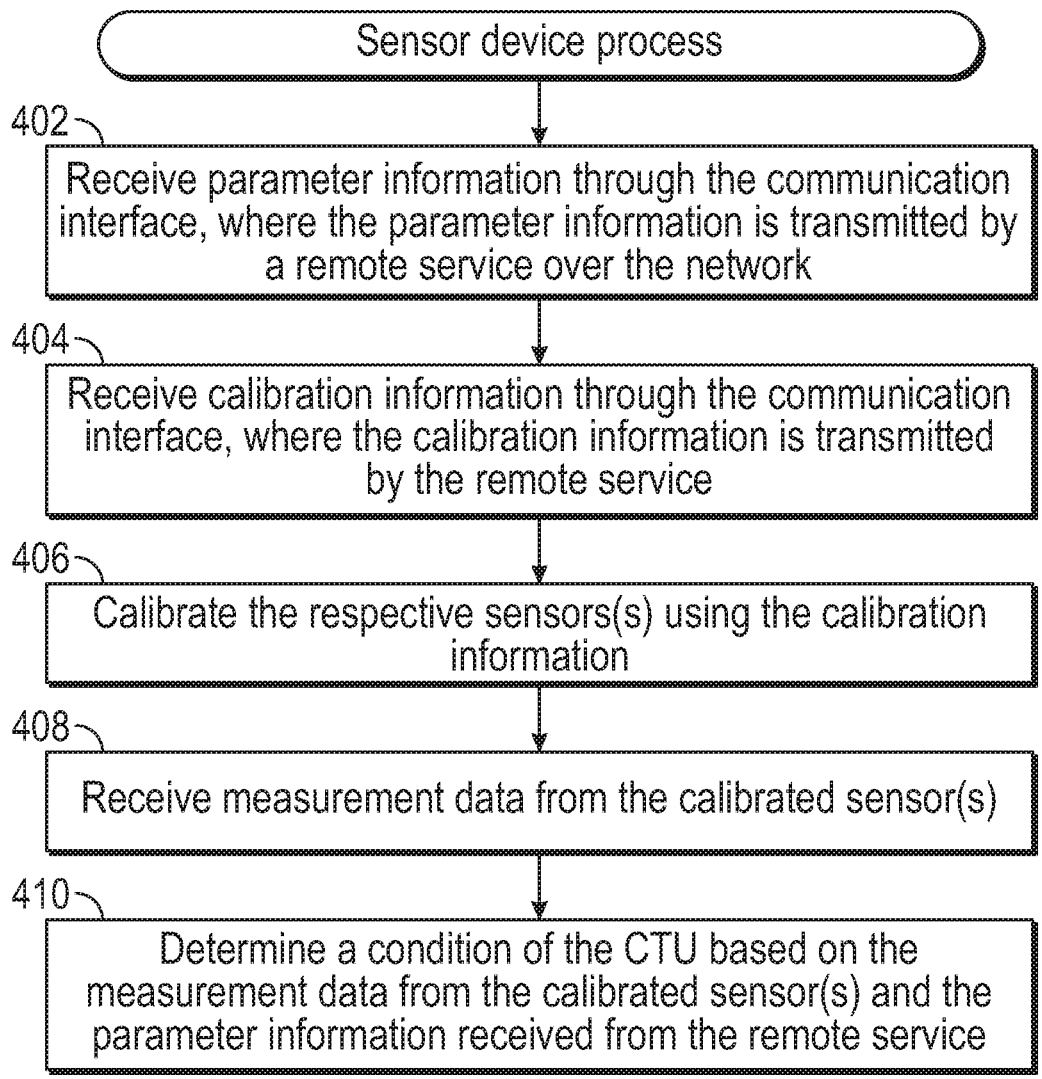
FIG. 4 is a flow diagram of a process of a sensor device, according to some implementations.

FIG. 4 is a flow diagram of a process performed by a sensor device, such as the sensor device 106-1 or 106-2 of FIG. 1. The sensor device receives (at 402) parameter information through the communication interface 108-1 or 108-2, where the parameter information is transmitted by a remote service (e.g., the server system 104) over the network 102. The sensor device further receives (at 404) calibration information through the communication interface 108-1 or 108-2, where the calibration information is transmitted by the remote service.

The sensor device calibrates (at 406) the respective sensor(s) using the calibration information.

The sensor device then receives (at 408) measurement data from the calibrated sensor(s). The sensor device (and more specifically, the processor 109-1 or 109-2 in the sensor device) determines (at 410) a condition of the CTU based on the measurement data from the calibrated sensor(s) and the parameter information received from the remote service.

Figure 5:
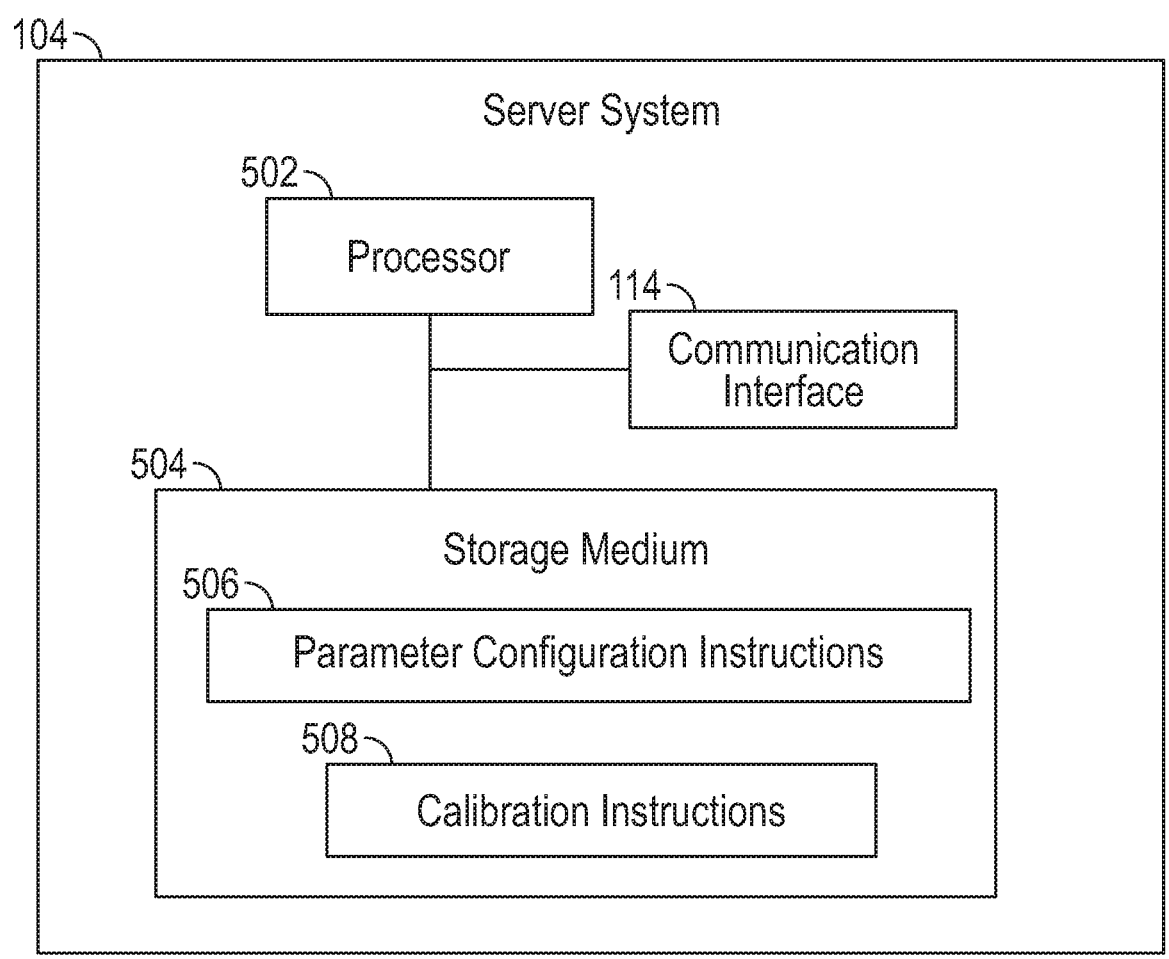
FIG. 5 is a block diagram of a server system according to some examples.

FIG. 5 is a block diagram of the server system 104 according to further examples. The server system 104 includes the communication interface 114 to communicate over the network 102 of FIG. 1. In addition, the server system 104 includes one or more processors 502. A processor can include a microprocessor, a core of a multi-core microprocessor, a microcontroller, a programmable integrated circuit, a programmable gate array, or another hardware processing circuit.

The server system 104 further includes a non-transitory machine-readable or computer-readable storage medium 504 that stores machine-readable instructions executable on the one or more processors 502 to perform respective tasks. The machine-readable instructions include parameter configuration instructions 506 that can perform the tasks of the parameter configuration engine 110 of FIG. 1, for example. The machine-readable instructions further include calibration instructions 508 that can perform the tasks of the calibration engine 112 of FIG. 1, for example.

The storage medium 504 (FIG. 5) or the storage 116-1 or 116-2 (FIG. 1) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A system comprising:
a communication interface; and
at least one processor configured to:
receive configuration information representing a configuration of a cargo transportation unit (CTU),
obtain a parameter for the configuration of the CTU, and
send, to a sensor device attached to the CTU, the parameter through the communication interface,
the parameter controlling detection of a condition associated with the CTU by the sensor device, wherein the parameter controls a signal strength of a signal emitted by a sensor in the sensor device, and wherein the parameter when set to a first value causes the sensor to emit the signal at a first signal strength, and the parameter when set to a second value causes the sensor to emit the signal at a second signal strength different from the first signal strength.

2. The system of claim 1, wherein the sensor of the sensor device is to detect a cargo loading of the CTU, the received configuration information represents a dimension of the CTU, and the parameter sent to the sensor device controls a detection of an amount of the cargo loading based on measurement data from the sensor.

3. The system of claim 2, wherein the parameter comprises a threshold relating to the dimension, the dimension being a dimension of a space to receive cargo in the CTU.

4. The system of claim 1, wherein the parameter is settable to different values for different configurations of the CTU, and wherein the configuration is one of the different configurations.

5. The system of claim 4, wherein the first value indicates a first configuration of the CTU having a door, and the second value indicates a second configuration of the CTU that is without the door.

6. The system of claim 1, wherein the sensor device further comprises a motion sensor to detect a motion of the CTU, and the at least one processor is configured to further:
obtain a further parameter for the configuration of the CTU, wherein the further parameter controls a detection of the motion of the CTU based on measurement data from the motion sensor.

7. The system of claim 6, wherein the further parameter is settable to different values to indicate different types of suspensions of the CTU, and wherein the configuration includes one of the different types of suspensions.

8. The system of claim 1, wherein the sensor device further comprises a door sensor to detect a status of a door of the CTU, and the at least one processor is configured to further:
obtain a further parameter for the configuration of the CTU, wherein the further parameter controls a detection of whether the door of the CTU is open or closed.

9. The system of claim 8, wherein the further parameter is settable to different values to indicate different types of doors, and wherein the configuration includes one of the different types of doors.

10. The system of claim 1, wherein the sensor device further comprises an environment sensor to detect an environmental condition in the CTU, and the at least one processor is configured to further:
obtain a further parameter for the configuration of the CTU, wherein the further parameter controls a detection of whether the environmental condition violates a criterion.

11. The system of claim 1, wherein the at least one processor is configured to send, to the sensor device, calibration information to calibrate the sensor device to detect the condition associated with the CTU.

12. The system of claim 11, wherein the calibration information comprises one or more of information to calibrate for a dimension of the CTU, information to calibrate for an ambient environmental condition of the CTU, and information to calibrate for a cargo carried by the CTU.

13. The system of claim 1, wherein the at least one processor is configured to receive the configuration information from a sensor of the CTU.

14. A sensor device for attachment to a cargo transportation unit (CTU), comprising:
a sensor;
a communication interface to communicate over a network; and
at least one processor configured to:
receive a parameter through the communication interface, the parameter transmitted by a remote service over the network,
modify an operating characteristic of the sensor based on the parameter to provide a calibrated sensor, wherein the operating characteristic is a signal strength of a signal emitted by the sensor, wherein the modifying comprises:
setting a first signal strength of the signal emitted by the calibrated sensor when the parameter is set to a first value;
setting a second signal strength of the signal emitted by the calibrated sensor when the parameter is set to a second value, the second signal strength being different from the first signal strength,
receive measurement data from the calibrated sensor, and
determine a condition of the CTU based on the measurement data.

15. The sensor device of claim 14, wherein the condition of the CTU comprises an amount of cargo loading of the CTU, and the parameter controls a determination of the amount of the cargo loading based on the measurement data from the calibrated sensor.

16. The sensor device of claim 14, further comprising:
a motion sensor,
wherein the at least one processor is configured to:
receive a further parameter through the communication interface,
modify an operating characteristic of the motion sensor based on the further parameter to provide a calibrated motion sensor,
receive measurement data from the calibrated motion sensor, and
determine a motion of the CTU based on the measurement data from the calibrated motion sensor.

17. The sensor device of claim 14, further comprising:
a door sensor,
wherein the at least one processor is configured to:
receive a further parameter through the communication interface,
modify an operating characteristic of the door sensor based on the further parameter to provide a calibrated door sensor,
receive measurement data from the calibrated door sensor, and
determine a status of a door of the CTU based on the measurement data from the calibrated door sensor.

18. A method performed by a sensor device in a cargo transportation unit (CTU), comprising:
receiving a parameter through a communication interface, the parameter transmitted by a remote service over a network;
calibrating a sensor of the sensor device in the CTU based on the parameter, the calibrating of the sensor comprising modifying an operating characteristic of the sensor based on the parameter, wherein the operating characteristic is a signal strength of a signal emitted by the sensor, wherein the modifying comprises:
setting a first signal strength of the signal emitted by the calibrated sensor when the parameter is set to a first value;
setting a second signal strength of the signal emitted by the calibrated sensor when the parameter is set to a second value, the second signal strength being different from the first signal strength;
measuring, by the calibrated sensor, measurement data of the CTU; and
determining a condition of the CTU based on the measurement data from the calibrated sensor.

* * * * *